United States Patent Office 2,829,146
Patented Apr. 1, 1958

2,829,146

PYRROLIDINE COMPOUNDS

David J. Beaver, Richmond Heights, and Paul J. Stoffel, St. Louis, Mo., assignors to Monsanto Chemical Company, St. Louis, Mo., a corporation of Delaware No Drawing. Application July 30, 1956
Serial No. 600,687

8 Claims. (Cl. 260—326.3)

This invention relates to new and useful pyrrolidine compounds and to processes for making same.

In accordance with this invention it has been found that N-(halophenylcarbamyl) pyrrolidine compounds of the structure

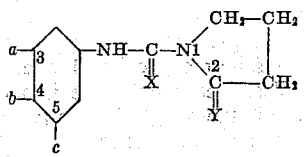

wherein X and Y, respectively, are sulfur or oxygen, wherein $a$, $b$ and $c$ are hydrogen or halogen, and wherein at least two of said substituents $a$, $b$ and $c$ are halogen, are useful in the control of noxious vegetation. Many of these compounds are useful bacteriostats, particularly with respect to control of Micrococcus pyogenes var. aureus. The new compounds are prepared by reacting pyrrolidine-2-thione or pyrrolidine-2-one with a halophenylisocyanate of the structure

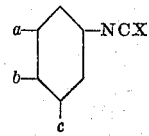

wherein X is sulfur or oxygen, and wherein $a$, $b$ and $c$ have the aforedescribed significance in an inert solvent at a temperature in the range of room temperature to the reflux temperature of the system.

The compounds of this invention which are effective in the control of bacteria are the N-(halophenylcarbamyl) pyrrolidine-2-thiones, and as illustrative of their preparation is the following:

*Example I*

To a suitable reaction vessel is added and intimately mixed 5.1 parts by weight of pyrrolidine-2-thione, 9.4 parts by weight of 3,4-dichlorophenylisocyanate, and 24 parts by weight of acetone. The mass is agitated for about 2 hours. Approximately 50% of the acetone is evaporated and to the residue is added 20 parts by weight of diethyl ether and the mass agitated for a short period and filtered. The precipitate is filtered off, dried and recrystallized from an anhydrous mixture of ethyl alcohol and acetone. The fine granular white powder melting at 171.9–172.8° C. is N-(3,4-dichlorophenylcarbamyl) pyrrolidine-2-thione.

Employing the procedure of Example I but replacing 3,4-dichlorophenylisocyanate with an equal weight of 3,5-dichlorophenylisocyanate, there is obtained N-(3,5-dichlorophenylcarbamyl) pyrrolidine-2-thione.

Employing the procedure of Example I but replacing 3,4-dichlorophenylisocyanate with a chemically equivalent weight of 3,4,5-trichlorophenylisocyanate, there is obtained N-(3,4,5-trichlorophenylcarbamyl) pyrrolidine-2-thione.

As further illustrative of the compounds of this invention is the following:

*Example II*

To a suitable reaction vessel is added and intimately mixed 5.1 parts by weight of 3,4-dichlorophenylisothiocyanate and 2.5 parts by weight of pyrrolidine-2-thione. The mix so obtained is heated at 90–95° C. for 18 hours. The mass is then slurried with approximately 75 parts by weight of warm ethanol and filtered. The collected precipitate is recrystallized from a mixture of ethanol and dimethyl formamide. The resultant dried product is a soft yellow powder melting at 126.7–127.7° C. and is identified as N - (3,4 - dichlorophenylthiocarbamyl) pyrrolidine-2-thione.

*Example III*

To a suitable reaction vessel is added and intimately mixed 9.4 parts by weight of 3,4-dichlorophenylisocyanate, 4.3 parts by weight of pyrrolidine-2-one and 40 parts by weight of diethyl ether. The mass is agitated for 1 hour at approximately room temperature and the ether is evaporated. The white granular product so obtained is identified as N-(3,4-dichlorophenylcarbamyl) pyrrolidine-2-one, melting point 151.8–152.7° C.

The new compounds when employed in the control of noxious vegetation whether grasses or broadleaf plants may be used in the form of aqueous suspensions or oil-in-water emulsions, but preferably aqueous suspensions containing a phytotoxic amount of the N-(halophenylcarbamyl) pyrrolidine-2-thione or -2-one. The aqueous suspensions may be obtained simply by dissolving the pyrrolidine compound in a suitable solvent and dispersing the solution in water employing a wetting agent. Dispersing or emulsifying agents such as the alkyl aryl sulfonates and the polyethyleneglycol derivatives are advantageously employed in the preparation of the herbicidal suspensions or emulsions and a wetting or penetrating agent is desirable for simple aqueous suspensions. The new herbicides are preferably applied by spraying aqueous suspensions or oil emulsions of the same, this method affording an easy and inexpensive way of destroying noxious vegetation. For general utility aqueous suspensions in concentrations of 0.01 to 10 parts of the new herbicide per 100 parts water may be employed.

In order to illustrate the bacteriostatic activity of the N-(halophenylcarbamyl) pyrrolidine-2-thiones, i. e. compounds of the structure

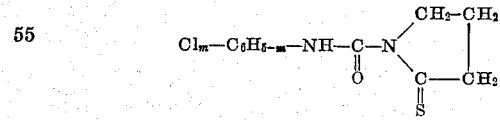

where $m$ is a whole number from 2 to 3, and wherein the phenyl radical ($-C_6H_{5-m}$) is free of ortho substituents, N-(3,4-dichlorophenylcarbamyl) pyrrolidine-2-thione was incorporated in an alkali metal fatty acid soap in a weight ratio of one part per 50 parts soap. Aliquots were added to a Sabourard's dextrose agar medium so as to give concentrations in parts per million as set forth below of the respective compounds in the agar. The agar in each case was then poured into a petri dish, allowed to harden and then inoculated with standard culture of Micrococcus pyogenes var. aureus standard resistance. The incubation in each instance made at 37° C. for 48 hours. The extent of growth is noted below:

| Compound/Concentration, p. p. m. | 100 | 10 | 1 |
|---|---|---|---|
| 1-(N-carbox-3, 4-dichloroanilide) pyrrolidine-2-thione | none | none | none |

While this invention has been described with respect to certain embodiments, it is not so limited and it is to be understood that variations and modifications thereof obvious to those skilled in the art may be made without departing from the spirit or scope of this invention.

What is claimed is:

1. Compounds of the structure

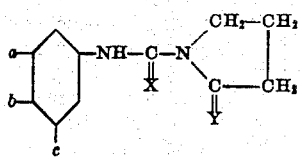

wherein X and Y, respectively, are atoms selected from the group consisting of sulfur and oxygen, wherein $a$, $b$ and $c$ are atoms selected from the group consisting of hydrogen and halogen, wherein at least two of said substituents $a$, $b$ and $c$ are halogen, and wherein the halogen substituents are selected from the group consisting of bromine and chlorine.

2. Compounds of the structure

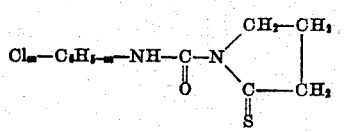

wherein $m$ is a whole number from 2 to 3, and wherein the phenyl radical $-C_6H_{5-m}-$ is free of ortho substituents.

3. N - (3,4 - dichlorophenylcarbamyl) pyrrolidine-2-thione.

4. N - (3,5 - dichlorophenylcarbamyl) pyrrolidine-2-thione.

5. N - (3,4,5 - trichlorophenylcarbamyl) pyrrolidine-2-thione.

6. N - (3,4 - dichlorophenylcarbamyl) pyrrolidine-2-one.

7. N - (3,4 - dichlorophenylthiocarbamyl) pyrrolidine-2-thione.

8. The method of making the compounds of claim 1 which comprises reacting an amine of the structure

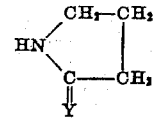

wherein Y is selected from the group consisting of sulfur and oxygen, with a halophenylisocyanate of the structure

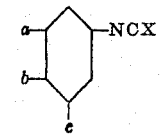

wherein X is sulfur or oxygen, and wherein $a$, $b$ and $c$ have the aforedescribed significance in an inert solvent at a temperature in the range of room temperature to the reflux temperature of the system.

References Cited in the file of this patent
UNITED STATES PATENTS
2,651,639    Angier _____ Sept. 8, 1953